US007591858B2

United States Patent
Keilmann et al.

(10) Patent No.: US 7,591,858 B2
(45) Date of Patent: Sep. 22, 2009

(54) MIRROR OPTIC FOR NEAR-FIELD OPTICAL MEASUREMENTS

(75) Inventors: Fritz Keilmann, Berg (DE); Rainer Hillenbrand, Prittriching (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 317 days.

(21) Appl. No.: 11/653,601

(22) Filed: Jan. 16, 2007

(65) Prior Publication Data

US 2007/0183060 A1 Aug. 9, 2007

(30) Foreign Application Priority Data

Jan. 18, 2006 (DE) ........................ 10 2006 002 461

(51) Int. Cl.
*G01B 15/00* (2006.01)
(52) U.S. Cl. ................. 850/30; 250/216; 250/251; 850/9; 977/862
(58) Field of Classification Search ......... 250/306, 250/307, 308, 309, 310, 311, 251, 216, 234, 250/235; 850/30, 29, 24, 6, 53; 356/364, 356/369; 977/862
See application file for complete search history.

(56) References Cited

U.S. PATENT DOCUMENTS

| 5,138,158 | A | * | 8/1992 | Ninomiya et al. ........... 250/305 |
| 5,770,855 | A | * | 6/1998 | Fischer ....................... 250/216 |
| 6,833,904 | B1 | * | 12/2004 | Komatsuda ................. 355/67 |
| 6,881,947 | B2 | * | 4/2005 | Mitsuoka et al. ............. 250/216 |
| 2004/0062045 | A1 | * | 4/2004 | Chang ........................ 362/346 |
| 2005/0117227 | A1 | | 6/2005 | Gal et al. |
| 2005/0133693 | A1 | * | 6/2005 | Fouquet et al. ........... 250/214 R |
| 2006/0082875 | A1 | * | 4/2006 | Okitsu et al. ................ 359/448 |
| 2006/0109480 | A1 | * | 5/2006 | Hidaka ....................... 356/600 |
| 2006/0197021 | A1 | * | 9/2006 | Ouchi ........................ 250/343 |

FOREIGN PATENT DOCUMENTS

| DE | 599 970 | | 7/1934 |
| DE | 103 01 633 A1 | | 7/2004 |
| WO | WO2004/074816 | * | 9/2004 |
| WO | WO2005/078502 A1 | | 8/2005 |

OTHER PUBLICATIONS

Nakano et al., "Infrared evanescent-field microscope using CO2 laser for reflectance measurement", *Optik* 94(4):159-162 (1993).
Ueyanagi et al., "Proposal of a Near-Field Optical Head Using a New solid Immersion Mirror", *Japanese Journal of Applied Physics* 39(2000):888-891.

\* cited by examiner

*Primary Examiner*—David A Vanore
*Assistant Examiner*—Nicole Ippolito Rausch
(74) *Attorney, Agent, or Firm*—Drinker Biddle & Reath LLP

(57) ABSTRACT

A mirror optic (10) is provided for near-field optical measurement of a specimen (1), wherein the mirror optic (10) has a reflector (11) with the shape of a paraboloid with a paraboloid axis (12) and a focal point (13), which can be illuminated along a first illumination beam path (I), whereby the reflector 11 has at least one edge recess (14) in such a way that the focal point (13) can be illuminated along a second illumination beam path (II) which deviates from the first illumination beam path (I). A near-field microscope with such a mirror optic is also provided.

13 Claims, 3 Drawing Sheets

MIRROR OPTIC FOR NEAR-FIELD OPTICAL MEASUREMENTS

FIELD OF THE INVENTION

The invention is related to a mirror optic adapted, for near-field optical measurement of a specimen, a near-field microscope fitted with such a mirror optic and a method of near-field microscopy.

BACKGROUND OF THE INVENTION

Optical near-field microscopy is based upon the measurement of scattered light at a near-field probe which is affected by optical near-field interaction between the near-field probe and a specimen. To achieve high local resolution capacity, a probe tip, for example, is used as a near-field probe, as known from atomic force microscopy. The near-field probe is illuminated by focused light to generate the scattered light. Focusing should be as free from chromatic errors as possible, to avoid measurement errors with illumination at different wavelengths, e.g. in the visible or middle infra-red spectrum. Hitherto, transmitting optical components, e.g. optical lenses, by means of which the requisite suppression of chromatic errors due to material dispersion in the components cannot be achieved, or can only be achieved to an insufficient extent, have been used for focusing in near-field microscopy.

To avoid chromatic errors caused by material dispersion, T. Nakano et al. proposed focusing the illuminating radiation with reflective optical components, e.g. rotation-symmetrical concave minor lenses ("Optik" Vol. 94, 1993, pp. 159- 162). A reflector in the shape of a paraboloid was, for example, used as a concave mirror lens, the paraboloid axis of which is perpendicular to the surface of the specimen under examination. This geometry produces irradiation of the near-field probe more or less perpendicular to the surface, as is usual with glass lenses in light-optical microscopy. A disadvantage of conventional reflectors is that the direction of polarization of the illuminating radiation is more or less transverse, but a light field strength oriented perpendicular to the specimen is preferred for the effect of optical near-field interaction with the specimen. If inclination of the conventional concave mirror lens is introduced, further disadvantages arise from the space required by the near-field probe and the outlay with an adjustment being free of coma aberration.

In the "Japanese Journal of Applied Physics", Vol. 39, 2000, pp. 888-891, K. Ueyanagi et al. proposed providing a read head for the near-field optical readout of an optical data memory with a focusing reflector. The reflector is a SIM (solid immersion mirror) with a surface in the form of a semi-paraboloid. The reflector is aligned so that the paraboloid axis of the cut paraboloid extends in parallel to the surface of the optical data memory, and illuminating radiation which is directed along the paraboloid axis on to the surface is focused on to the surface of the optical data memory. The use of the SIM described by K. Ueyanagi is restricted to reading optical data memories. Use in optical near-field microscopy is precluded, as the SIM neither provides enough space for locating the near-field probe in the focal point of the mirror nor for monitoring its operation.

SUMMARY OF THE INVENTION

The objective of the invention is to provide an improved mirror optic, particularly for near-field optical measurement of a specimen, which overcomes the disadvantages of conventional concave mirror lenses and which has an extended range of application, particularly in near-field microscopy. The mirror optic is intended to allow for a location of the near-field probe in the focal point of the mirror optic and an illumination thereof. In addition, it is intended to provide focusing of the illuminating radiation with fewer optical errors and an optimized direction of polarization. The objective of the invention is also to provide an improved optical near-field microscope which overcomes the disadvantages of conventional near-field microscopes and which allows for a better illumination of the near-field probe in respect of optical errors and polarization.

These objectives are solved by a mirror optic and a near-field microscope with the features as disclosed herein. Advantageous embodiments and applications of the invention are also disclosed.

In accordance with a first aspect, the invention is based upon the general technical teaching of providing a mirror optic with a reflector in the shape of a paraboloid, the edge of which is shaped so that at least two illumination beam paths can be directed on to one focal point of the reflector. The (reflecting) surface of the reflector is recessed so that at least two unobstructed light paths may be formed which extend through the focal point of the reflector. The provision of at least one edge recess of the reflector advantageously facilitates the location of a near-field probe at the focal point of the reflector, so that, firstly, the illumination beam paths are not obstructed by the mounting of the near-field probe and secondly operation of the near-field sensor is not restricted by the operation (movement and oscillation) of the near-field probe.

The inventors have found that a paraboloid, the edge of which forms a circular arc in a plane perpendicular to the paraboloid axis, is not absolutely necessary for fault-free focusing along the first illumination beam path for excitation and observation of scattered light at the near-field detector. In accordance with the invention, even a paraboloid with at least one edge recess, which also provides optical access along a second illumination beam path for observing the specimen and/or the near-field probe, facilitates effective light collection at the near-field probe. The cut reflector surface facilitates both the focusing of collimated first illuminating radiation on the near-field probe to generate scattered light and the focusing of second illuminating radiation for observation of the specimen and/or the near-field probe.

The shape of the inventive reflector used represents part of a paraboloid. The term "paraboloid" is used here to define any geometrical area with an axis (paraboloid axis) of which a section parallel to the paraboloid axis produces a parabola. A section perpendicular to the paraboloid axis produces a circle. The paraboloid is a paraboloid of revolution. The intersection between the paraboloid axis and the paraboloid is called as the origin of the paraboloid.

The reflector has a first edge which restricts the paraboloid surface in one direction parallel to the paraboloid axis. The first edge is also defined here as the principal aperture of the paraboloid. The principal aperture typically extends in a plane perpendicular to the paraboloid axis.

If, in accordance with a modified embodiment of the invention, the reflector is provided for an oblique alignment relative to the surface of the specimen, the principal aperture can also extend in a plane which forms an angle with the paraboloid axis which is not equal to 90°. The reflector used inventively has a second edge which is formed by the provision of the edge recess for the second illumination beam path. The second edge is also called here as the side aperture of the paraboloid. In general, the side aperture is formed by a section of the paraboloid, the plane of which section does not extend through the origin of the paraboloid and which is not perpendicular to the paraboloid axis. The edge recess is typically formed by a section plane of the paraboloid which extends in parallel to the paraboloid axis at a distance from it. The section plane may be inclined in relation to the paraboloid axis, particularly when used with a reflector in an oblique position.

In accordance with a preferred embodiment of the invention, the reflector forms a semi-paraboloid. In this case, the reflector has an additional third edge which restricts the paraboloid form in or in the vicinity of a mid-plane of the paraboloid. The third edge is also called as the base aperture of the paraboloid. In this case, the term "semi-paraboloid" means both precise halving and also the case of a paraboloid additionally recessed at the base aperture. The mirror optic can thus advantageously be located relative to a plane surface of a specimen to be examined so that the paraboloid axis extends in parallel to or into the surface of the specimen. In this embodiment of the invention the first illumination beam path is advantageously aligned in parallel to the surface of the specimen. Polarization of the first illumination beam path can be aligned so that light with polarization more or less perpendicular to the surface of the specimen is provided at the near-field probe.

Cone angles in relation to the focal point of the reflector are spanned by the edges of the paraboloid-shaped reflector, leaving space free for the near-field probe and the first and second illumination beam paths. In accordance with a preferred variation of the invention, the cone angle α of the reflector formed in a mid-plane between the second and the third edge is set in a range of 20°-70°. The inventors have found that highly-effective illumination of the focal point by the first illumination beam path is possible for angles in this range without cutting the second illumination beam path too strongly.

The first edge of the paraboloid forms the principal aperture with a predetermined cone angle β. The cone angle β represents the angle below which the light reaches the focal point on the first illumination beam path. If the cone angle β is set between 30° and 240°, the collection of light at the focal point of the reflector can be improved advantageously.

A major advantage of the inventive mirror optic is that several operating conditions of near-field microscopy can be fulfilled simultaneously, including movement of the specimen in relation to the near-field probe and mirror lens, the near-field probe mounting, the reversibility of the first illumination beam path for reading the scattered light and optical access to the microscopic observation of the near-field probe and/or reading deflection of the near-field probe. Moreover, the light can be polarized so that the field strength contains a strong component along the near-field probe perpendicular to the surface of the specimen, which is a particular advantage due to the antenna function of metallic probe tips in scattering-type scanning near-field microscopy (sSNOM).

If the mirror optic is provided with an adjustment element, in accordance with a further preferred embodiment of the invention, advantages may emerge for an adjustment of the first illumination beam path in relation to the paraboloid axis of the reflector. The adjustment element is an optical component with a plane reflector, the surface of which is located perpendicularly to the paraboloid axis of the reflector. A plane mirror or another reflective component with a flat surface may, for example, be used as the adjustment element.

The adjustment element is preferably located on one edge of the reflector, to preclude interference with the first or second illumination beam paths. Location on the second edge, i.e. on the periphery of the reflector edge recess provided inventively, is particularly preferable.

If the illumination intensity at the position of the adjustment element is insufficient for reliable adjustment, the mirror optic can be provided with a deflector element, in accordance with a further variation of the invention. The deflector element is located in the opening paraboloid in the first illumination beam path and diverts part of the illuminating radiation from the first illumination beam path to the adjustment element. The deflector element is preferably a plane, parallel, transparent plate, e.g. glass. The edge of the reflector of the mirror optic is advantageously illuminated with the aid of the deflector element.

In practice, the mirror optic can be produced advantageously by optical components of different types. In accordance with one variation, the reflector of the mirror optic includes a concave mirror, by means of which chromatic aberrations can be advantageously precluded. Alternatively, the reflector may be provided by a SIM optic, containing a reflective interface corresponding to the inventively-provided paraboloid shape. The SIM preferably has the structure of a SIM lens. The diameter of the focal point as a function of the refraction index of the material can be advantageously reduced by using the SIM optic and the intensity of the light at the near-field probe correspondingly increased.

To avoid reflection losses, the SIM optic may be provided with a plane input surface to avoid reflection losses. The provision of a dielectric coating on the input surface and/or the inclination of the input surface in accordance with Brewster's angle relative to the first illumination beam path are particularly preferred.

A further independent subject of the invention is a near-field microscope which contains at least one inventive mirror optic and at least one near-field probe. The mirror optic in the near-field microscope is preferably arranged in relation to a specimen in a specimen holder so that the paraboloid axis of the reflector extends parallel to the surface of the specimen.

Alternatively, as shown in FIG. 5, the paraboloid axis may be inclined in relation to the surface of the specimen at a reflector angle which is, for example, set in the range above 0° to 60°, preferably 10° to 45°, whereby in this case advantages may emerge for the adjustment or setting of a certain polarization of the first illumination beam path in relation to the alignment of the surface of the specimen. In particular, the first illumination beam path can thus be directed across the probe tip and its mounting, facilitating a compact structure.

In order to obtain as great as possible collection of light by the reflector with this variation, the first edge preferably does not extend through a plane perpendicular to the paraboloid axis, but through a plane perpendicular to the surface of the specimen. The angle between the plane spanned by the first edge and a normal on the paraboloid axis corresponds to the reflector angle. In addition, the second edge preferably does not extend through a plane parallel to the paraboloid axis, but parallel to the surface of the specimen. The angle between the plane spanned by the second edge and the paraboloid axis then also corresponds to the reflector angle.

The near-field microscope according to the invention is preferably provided with a light source device by means of which the near-field probe can be illuminated at the focal point of the mirror optic via the first illumination beam path. The mirror optic and the light source device are preferably fixed in relation to each other so that adjustments during optical near-field measurement can be avoided. The light source device can advantageously produce illuminating beams on several different wavelengths for measurements with spectral resolution. For this purpose, several laser sources with different emission wavelengths may be provided in the light source device. The illuminating beams on the different wavelengths are focused on the near-field probe at the focal point of the near-field probe in parallel to each other on the first illumination beam path.

The near-field microscope according to the invention is preferably also provided with a detector by which the light scattered by the near-field probe can be detected. The mirror optic used according to the invention advantageously detects a large spatial angle to collect the light scattered at the near-field probe, so that the near-field microscope is distinguished by high collection efficiency and an improved signal-to-noise ratio.

The spatial angle covered by the mirror optic corresponds to a large cross-section of the parallel beams on the first illumination beam path. As the parallel beam is not compact but deformed in the form of a rectangle or elongated, a division of the parallel beam into two or more beams extending adjacently may be provided. Several beams may thus be advantageously directed on to the near-field probe in this way or the light scattered back detected with spatial separation.

A method of near-field optical measurement of a specimen using a mirror optic system according to invention or an near-field microscope according to invention represents an independent subject of the invention.

BRIEF DESCRIPTION OF THE DRAWINGS

The drawings appended to the following description display further details and advantages of the invention.

DETAILED DESCRIPTION OF THE INVENTION

Figure 1:
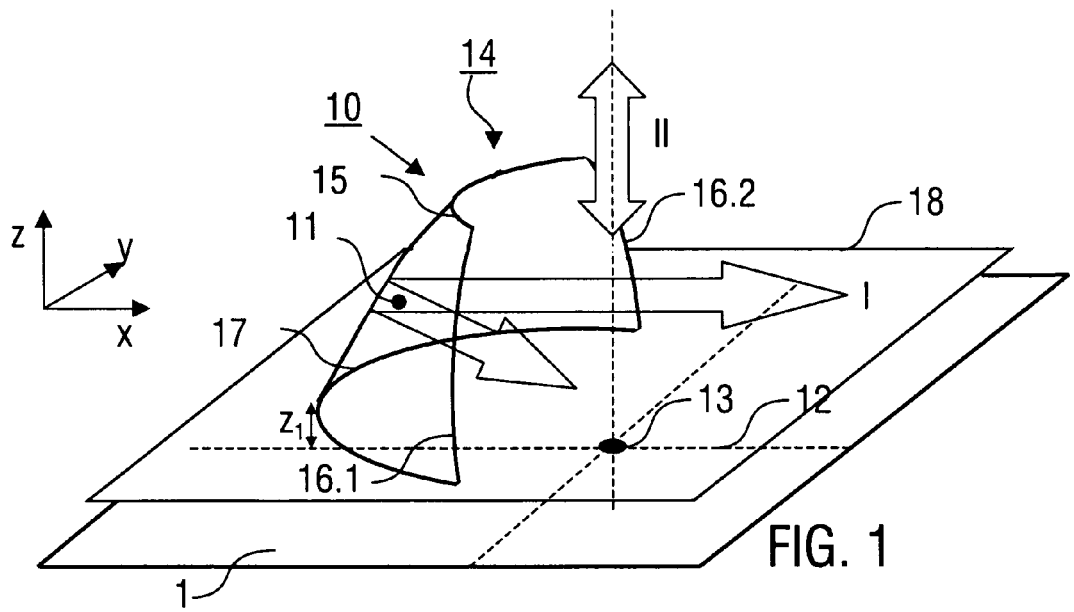
FIG. 1 is a diagrammatic representation of the paraboloid shape of the reflector of a mirror optic cut according to the invention.

FIG. 1 illustrates an embodiment of a mirror optic 10 according to the invention, formed by a concave mirror. The reflector 11 is formed on the inner curve of the concave mirror, wherein the surface of the reflector 11 forms a recess of a paraboloid with the focal point 13 on the paraboloid axis 12. In the example illustrated, the paraboloid axis 12 extends in direction x. The paraboloid surface opens in the direction x.

The shape of the reflector 11 is determined by the following three sections of the paraboloid. The first section extends in parallel to the y-z plane to form the first (forward) edge 16.1, 16.2 of the reflector 11. The principal aperture of the paraboloid is cut so that the focal point 13 lies outside the space enclosed by the reflector 11. The second and third sections extend in parallel to the x-y plane, forming the upper (second) edge 15 and the lower (third) edge 17. With upper edge 15 the edge recess 14 provided according to the invention takes the form of a side aperture of the paraboloid. The lower edge 17 lies in a plane 18 which is at a predetermined distance $z_1$ from the paraboloid axis 12 containing the focal point 13. The distance $z_1$ is, for example, 1 mm. The third edge restricts the shape of the semi-paraboloid in the vicinity of the middle plane of the paraboloid. Alternatively, a semi-paraboloid may be created in which the plane 18 coincides with the central plane of the paraboloid. In relation to the focal point 13, the lower edge 17 and the upper edge 15 form the cone angle $\alpha$ (see FIG. 2) and the root points of the forward edges 16.1, 16.2 form the cone angle $\beta$ (see FIG. 3).

The reflector 11 is cut so that a first illumination beam path I and a second illumination beam path II can be directed on to the focal point 13. The first illumination beam path I (illustrated diagrammatically) includes all the beams striking the reflector 11 in parallel to the paraboloid axis 12 (x direction) which are focused on the focal point 13 in accordance with the parabolic reflector shape. The scattered light radiated on all sides by a near-field probe at the focal point 13 is collected in the opposite direction by the reflector 11 and diverted in the x direction. The second illumination beam path II extends perpendicularly to the paraboloid axis 12 and to the plane 18. The second illumination beam path II may be directed on to the focal point 13 from the reflector side (as shown), from the opposite side, or from both sides. The second illumination beam path II creates an optical path on which the specimen and/or the near-field probe can be observed. In particular, the surface of the specimen can be detected by a microscope and/or the orientation of the near-field probe can be detected by an optical deflection detector.

Figure 2:
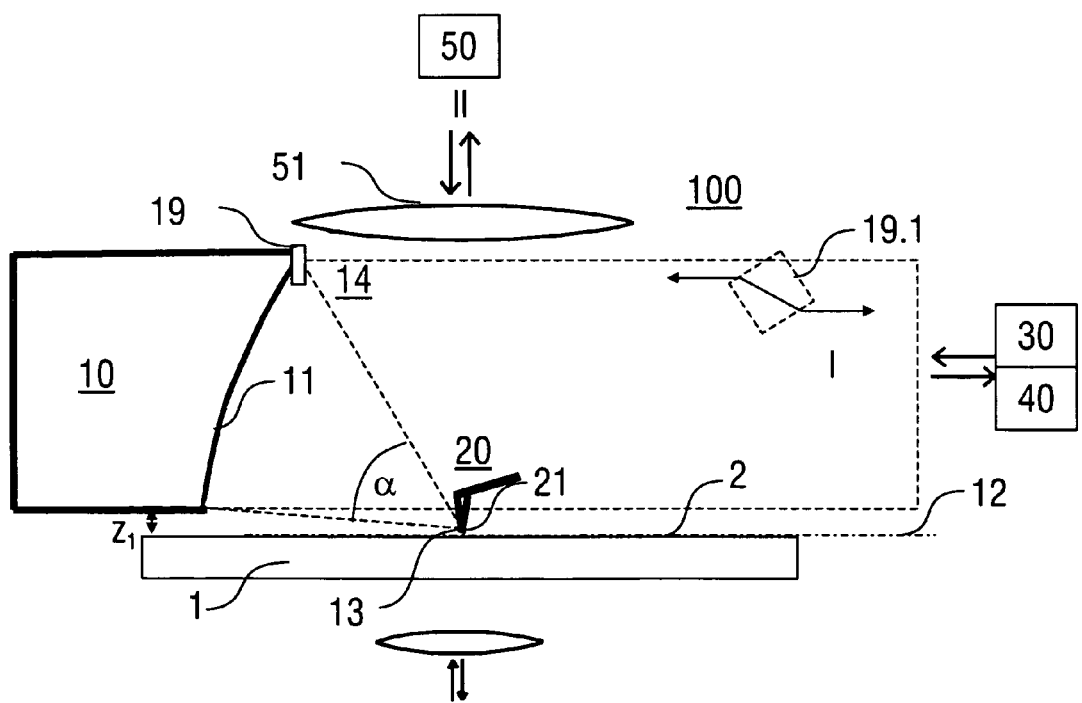
FIG. 2 is a diagrammatic side elevation of a near-field microscopic measurement arrangement with a first embodiment of the inventive mirror optic.
Figure 3:
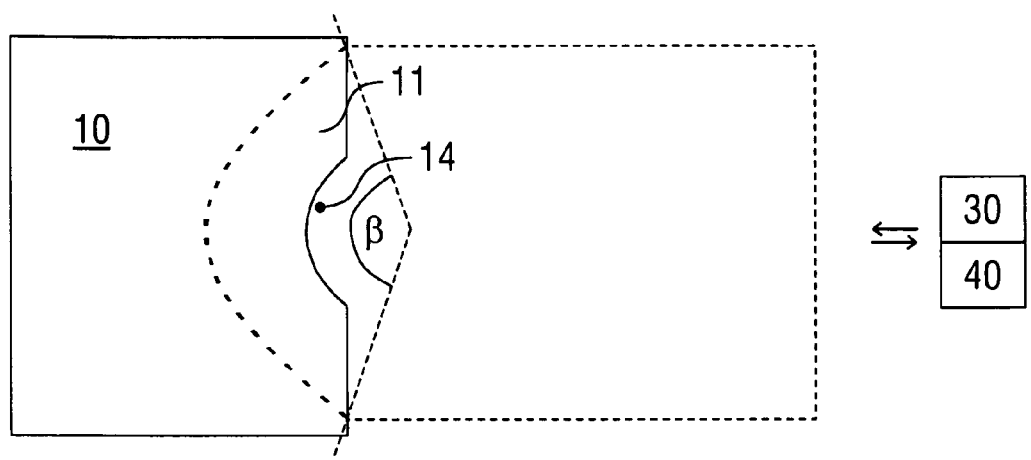
FIG. 3 is a diagrammatic horizontal projection of the embodiment of the invention shown in FIG. 2.

For use in near-field microscopy the reflector 11 is formed by a metal foil, e.g. in nickel, or by a coated concave surface of an optical component, as illustrated in FIGS. 2 and 3. In accordance with a further variation, a SIM optic may be provided, which is described below, with reference to FIG. 4.

FIGS. 2 and 3 illustrate an embodiment of an optical near-field microscope 100 according to the invention with the mirror optic 10, a near-field probe 20, a light-source device 30, a detector device 40 and a camera device 50. The diagrammatically-illustrated components 20 to 50 (only partially shown in the figure) and a control and analysis device (not shown) of the near-field microscope are constructed in the way known from conventional near-field microscopy.

The mirror optic 10 includes a mirror body with a concave surface, which forms the reflector 11. The surface of the reflector 11 represents a recess in a paraboloid as has been described above with reference to FIG. 1. The mirror body consists, for example, of aluminum.

The mirror optic 10 is located at distance $z_1$ above the surface 2 of the specimen 1 to be examined. The cone angle $\alpha$ between the lower edge 17 and the upper edge 15 is e.g. 50°. Parallel to the surface 2 of the specimen 1, the cone angle $\beta$ (see FIG. 3) is e.g. 150°. The paraboloid axis 12 of the reflector 11 extends in parallel to surface 2.

In accordance with a modified embodiment of the invention, the paraboloid axis 12 may be inclined relative to the surface 2 at a reflector angle of e.g. 20°. The first edge 16.1, 16.2 then extends perpendicularly to the surface of the specimen in a plane which correspondingly spans an angle of 70° with the paraboloid axis. In addition, the second edge 15 also spans 20° with the paraboloid axis, corresponding to the reflector angle.

The adjustment element 19 is located on the upper (second) edge 15 of the edge recess 14. The adjustment element 19 includes a plane mirror, the surface of which is aligned perpendicularly to the paraboloid axis 12. The radiation directed along the first illumination beam path I can be adjusted precisely in parallel to the paraboloid axis 12 with the adjustment element 19. For this purpose it is sufficient for the mirror surface of the adjustment element 19 to have small dimensions of e.g. 1 mm. Should the intensity of radiation on edge 15 be insufficient for the purposes of adjustment, a coplanar transparent plate 19.1 (shown as a dotted line) can be used in the first illumination beam path I, by which part of the light is diverted on to the adjustment element 19, without having any major effect on irradiation of the probe tip 21.

The light radiated in parallel to paraboloid axis 12 is focused on the probe tip 21 by the reflector 11. Focusing a strong component of the electrical field standing perpendicularly to the surface 2 of the specimen 1 on to the probe tip 21 is advantageously facilitated.

The second illumination beam path II extends perpendicularly to the paraboloid axis 12 between the near-field probe 20 and the camera device 50. A microscope lens 51 is located in the second illumination beam path II. The microscope lens 51 preferably has an operating distance which is greater than the vertical height of the mirror optic 10 above the focal point 13.

For example, a Cassegrain mirror lens (NA=0.55, operating distance 23 mm) is used. Additional observation of the underside of the specimen can be provided when examining a transparent specimen 1.

Figure 4:
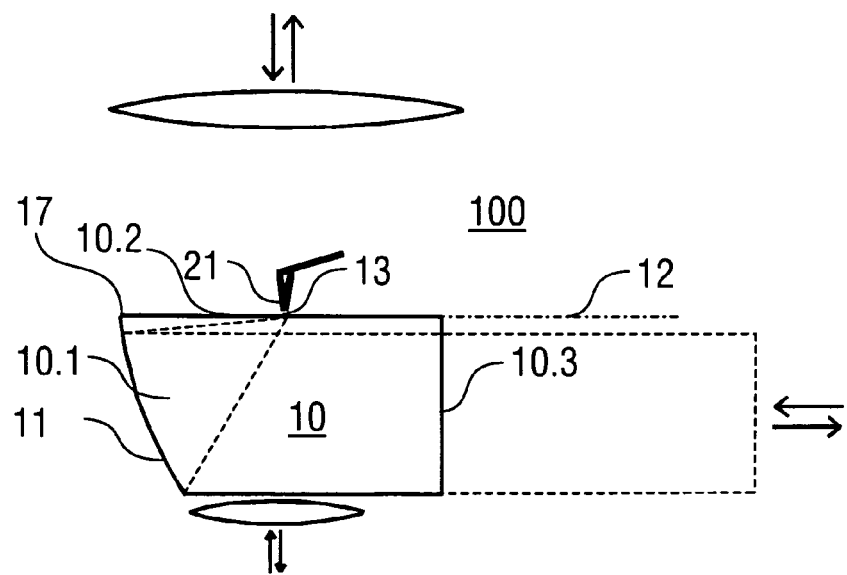
FIG. 4 is a diagrammatic side elevation of a near-field microscopic measurement arrangement with a further embodiment of an inventive mirror optic.
Figure 5:
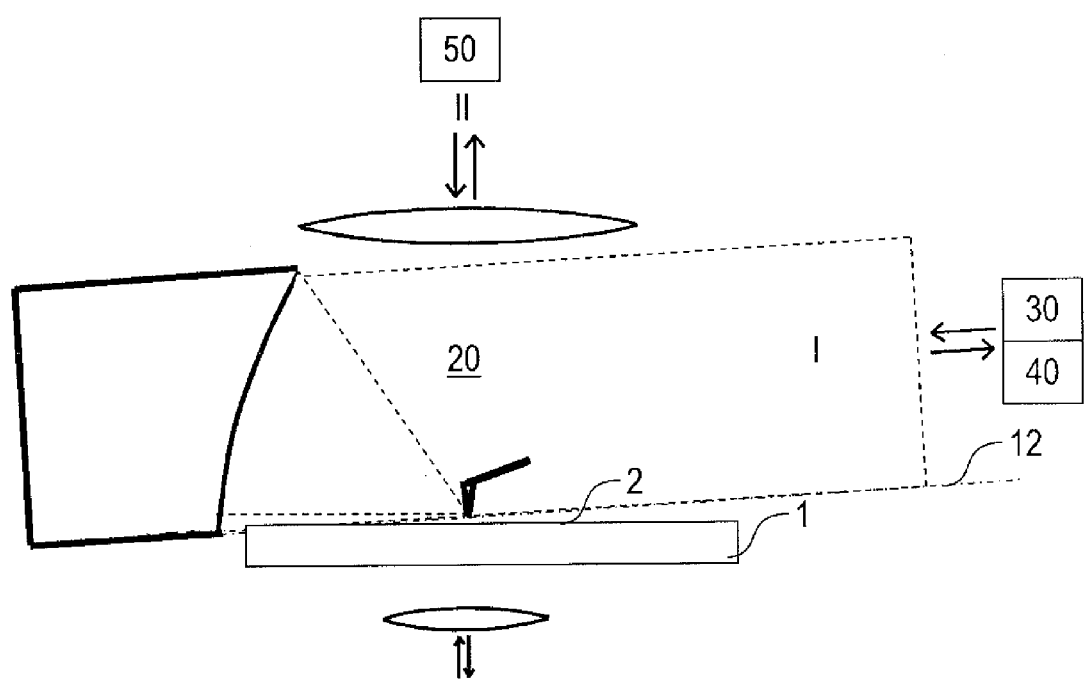
FIG. 5 illustrates an embodiment wherein the paraboloid axis 12 is inclined in relation to the surface 2 of the specimen 1 at a reflector angle which is greater than 0°.

FIG. 4 shows details of a further embodiment of the invention, in which the mirror optic 10 includes a SIM optic with a mirror body 10.1 in a transparent material. The mirror body 10.1 consists, for example, of glass or ZnSe. An advantage of this embodiment is that the diameter of the focal point is decreased by a factor which is equal to the refraction index of the material of the mirror body 10.1 (e.g. ZnSe: n=2.4). The intensity of light at the near-field probe increases correspondingly by a factor $n^2$. Gains of a similar magnitude are made in the collection of light scattered at the near-field probe.

With the mirror optic 10 in accordance with FIG. 4, the reflector 11 is formed by a curved surface of the mirror body 10.1 The reflection of the first illumination beam path I takes place by total internal reflection or by a metallic coating.

In the embodiment in accordance with FIG. 4, the reflector 11 forms a semi-paraboloid. The plane spanned by the edge 17 contains the paraboloid axis 12 and the focal point 13. In accordance with FIG. 4 the mirror body 10.1 is restricted by a plane surface 10.2 containing the focal point 13 on the aide on which the mirror body 10.1 adjoins the edge 17. The specimen to be examined is placed upon the surface 10.2 and scanned by the near-field probe 20, as known from near-field microscopy. If the specimen to be examined is located on a special substrate, e.g. a microscope cover slip, the mirror body 10.1 is excavated by the thickness of the particular substrate on the side of the surface 10.2.

The specimen substrate can be displaced advantageously on the mirror body 10.1, to examine different areas of the specimen by near-field microscopy, with the near-field probe 20 and the reflector 11 remaining stationery in accordance with one embodiment of the inventive microscopy method.

On the side facing the first illumination beam path I, the mirror body 10.1 has a plane input surface 10.3, which preferably has a dielectric coating matched to the different wavelengths or which is inclined at Brewster's angle, to avoid reflection losses.

The embodiments of near-field microscopes 100 according to the invention shown diagrammatically in FIGS. 2 and 4 each have a single mirror optic 10. In accordance with a modified embodiment of the invention, a near-field microscope may be fitted with two mirror optics, of which a first mirror optic in accordance with FIG. 2 is used to illuminate the probe tip 21 and the second mirror optic in accordance with FIG. 4 to collect the light scattered at the probe tip. In this case the first illumination beam path is spanned from a light source device via the first mirror optic to the probe tip, whilst a second illumination beam path from the probe tip via the second mirror optic to the detector device and a third illumination beam path for observation of the specimen and/or the probe tip are provided.

The characteristics of the invention disclosed in the above description, the drawings and the claims may be crucial to implementation of the invention, in its various embodiments, both individually or in combination.

What is claimed is:

1. A near-field microscope for investigating a specimen, the microscope comprising:
   a near-field probe;
   a light-source device arranged for illuminating the near-field probe along a first illumination beam path;
   a detector device arranged for detecting light scattered at the near-field probe along the first illumination beam path;
   a camera device arranged for observing the specimen and the near-field probe along a second illumination beam path;
   a mirror optic including a reflector;
      said reflector having the shape of a paraboloid with a paraboloid axis and a focal point, to which the first illumination beam path is directed extending in parallel to the paraboloid axis; and
      said reflector having at least one edge recess, through which the second illumination beam path is directed to the focal point, wherein the second illumination beam path deviates from the first illumination beam path; and
   an adjustment element being located on the edge recess and having a surface aligned perpendicularly to the paraboloid axis;
   wherein the near-field probe is arranged at the focal point of the mirror optic; and
   wherein a microscope lens is located in the second illumination beam path, the microscope lens having an operating distance from the focal point which is greater than a vertical height of the edge recess above the focal point.

2. The near-field microscope in accordance with claim 1, in which the reflector has the form of a semi-paraboloid.

3. The near-field microscope in accordance with claim 1, in which one edge of the edge recess and an opposite edge of the reflector form a cone angle α, set in the range from 20° to 70°.

4. The near-field microscope in accordance with claim 1, in which two opposing edge recesses of a principal aperture of the reflector form a cone angle β, set in the range from 30° to 240°.

5. The near-field microscope in accordance with claim 1, in which the reflector has a deflector element by which the light from the first illumination beam path can be deflected to the adjustment element.

6. The near-field microscope in accordance with claim 1, in which the reflector includes a concave mirror or a SIM, containing a reflective interface.

7. The near-field microscope in accordance with claim 6, in which the SIM optic has a plane surface on which the focal point lies.

8. The near-field microscope in accordance with claim 7, in which the SIM optic has a plane input surface which has a dielectric coating or which is inclined at Brewster's angle relative to the first illumination beam path.

9. The near-field microscope in accordance with claim 1, in which the mirror optic is located so that the paraboloid axis extends in parallel to a surface of the specimen.

10. The near-field microscope in accordance with claim 1, in which the mirror optic is located so that the paraboloid axis is at a reflector angle in relation to the surface of the specimen which is set in the range from 0° to 60°.

11. The near-field microscope in accordance with claim 1, in which the light source device is adjusted to produce several light beams which may be directed in parallel to each other along the first illumination beam path to the focal point of the mirror optic.

12. The near-field microscope in accordance with claim 11, in which the light source device is adjusted to produce several, spectrally different light beams.

13. The near-field microscope in accordance with claim 1, further comprising a detector device for detecting light scattered by the near-field probe along the first illumination beam path.

* * * * *